(12) United States Patent
Hymer et al.

(10) Patent No.: US 9,945,005 B2
(45) Date of Patent: Apr. 17, 2018

(54) SYSTEM AND METHOD FOR THE RECOVERY OF METAL VALUES FROM SLAGS, DROSSES, AND OTHER METAL-BEARING MATERIALS

(71) Applicant: Metals Technology Development Company, LLC, St. Louis, MO (US)

(72) Inventors: Timothy Roy Hymer, Labadie, MO (US); Bruce David Chamberlain, Festus, MO (US); Karl Friedrich Schneider, St. Louis, MO (US); Massimo Giuseppe Maccagni, Sesto San Giovanni (IT)

(73) Assignee: METALS TECHNOLOGY DEVELOPMENT COMPANY, LLC, St. Louis, MO (US)

( * ) Notice: Subject to any disclaimer, the term of this patent is extended or adjusted under 35 U.S.C. 154(b) by 512 days.

(21) Appl. No.: 14/513,192

(22) Filed: Oct. 13, 2014

(65) Prior Publication Data

US 2016/0102383 A1 Apr. 14, 2016

(51) Int. Cl.
| | |
|---|---|
| C22B 1/00 | (2006.01) |
| C22B 3/46 | (2006.01) |
| C22B 3/06 | (2006.01) |
| C21B 15/00 | (2006.01) |
| C22B 19/20 | (2006.01) |
| C22B 3/00 | (2006.01) |
| C25C 1/16 | (2006.01) |
| C22B 7/04 | (2006.01) |

(52) U.S. Cl.
CPC ............. *C22B 3/46* (2013.01); *C21B 15/00* (2013.01); *C21B 15/006* (2013.01); *C22B 1/00* (2013.01); *C22B 3/06* (2013.01); *C22B 7/04* (2013.01); *C22B 19/20* (2013.01); *C22B 19/22* (2013.01); *C25C 1/16* (2013.01); *Y02P 10/138* (2015.11); *Y02P 10/234* (2015.11)

(58) Field of Classification Search
CPC .... C22B 3/46; C22B 3/06; C22B 7/04; C22B 1/00; C22B 19/22; C22B 19/20; C21B 15/00; C21B 15/006; C25C 1/16; Y02P 10/138; Y02P 10/234
See application file for complete search history.

(56) References Cited

U.S. PATENT DOCUMENTS 4,292,147 A * 9/1981 Fray ................ C25C 1/16
205/342
6,696,029 B1 * 2/2004 Myerson ............ C01G 9/02
423/101

* cited by examiner

*Primary Examiner* — Arun S Phasge
(74) *Attorney, Agent, or Firm* — Harness, Dickey & Pierce, P.L.C.

(57) ABSTRACT

A method of recovering metal values from metal-bearing materials such as slags and drosses includes the steps of pulverizing the material to particles less than about 100 μm; leaching the pulverized material with a solution of ammonium chloride, sodium chloride, and potassium chloride; sequentially recovering at least two metals from the leachate by the addition of zinc using a sequential cementation process; and recovering zinc from the solution by electrowinning.

20 Claims, 1 Drawing Sheet

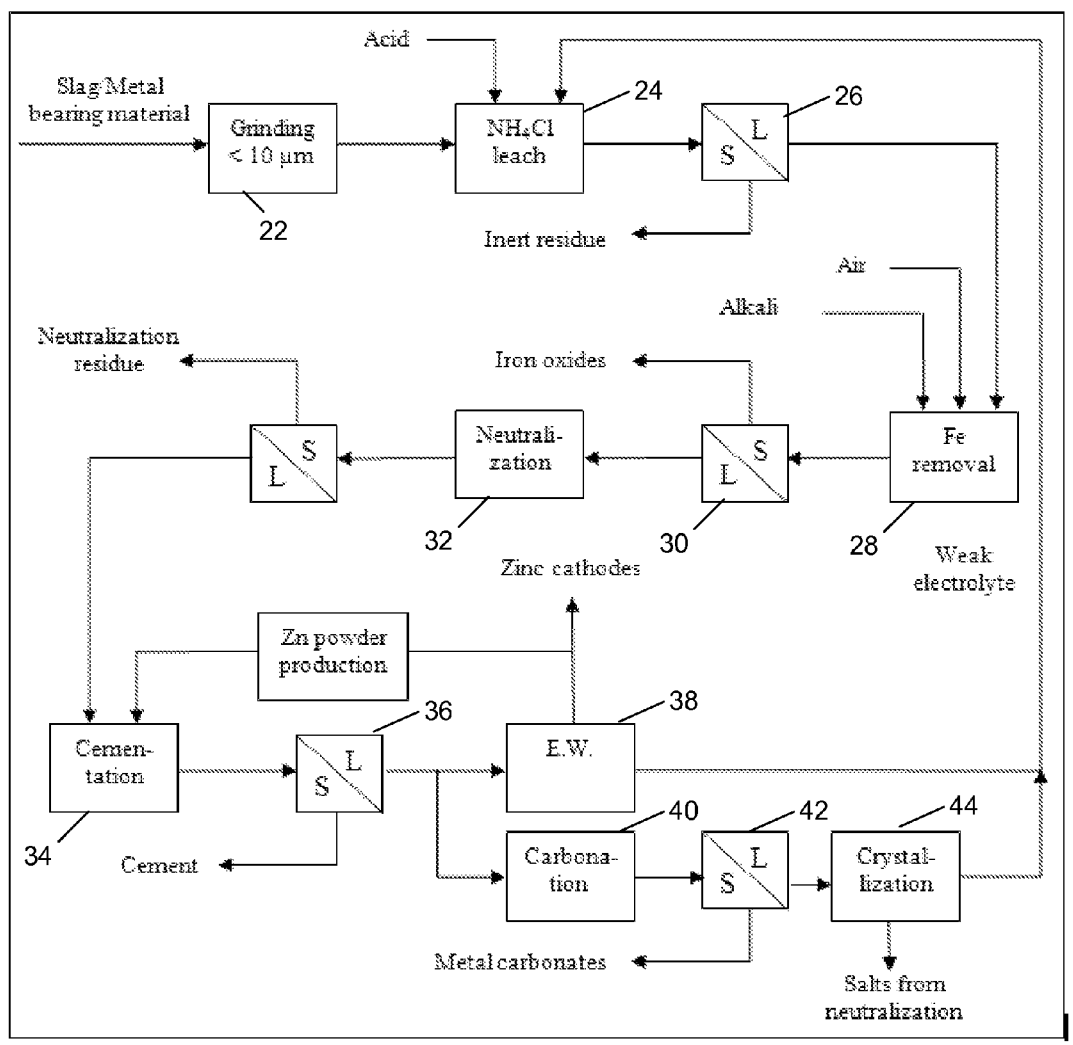

US 9,945,005 B2

SYSTEM AND METHOD FOR THE RECOVERY OF METAL VALUES FROM SLAGS, DROSSES, AND OTHER METAL-BEARING MATERIALS

FIELD

This invention relates to the recovery of metal values from metal-bearing materials such as slags and drosses, such as those produced in the pyrometallurgical production of metals from ores, or otherwise.

BACKGROUND

This section provides background information related to the present disclosure which is not necessarily prior art.

For centuries, the pyrometallurgical production of metal from ores or ore concentrates has resulted in the creation of slags and drosses as a by-product. The compositions of these slags and drosses vary, but they are typically a glassy or vitreous material with residual metal values in oxide, sulfide, and even elemental form. Because many of these slags and drosses can contain heavy metals such as lead, they generally cannot be put to use as a construction material or employed for other purpose. In older slags and drosses the metal values can be quite high, and even in more recent slags significant metal values are high despite improvements in metal recovery technologies.

Because of the residual metal values, slags and drosses are often the subject of environmental regulation, as they are in the United States. In the United States most slags are deemed hazardous waste as defined RCRA (40 CFR Part 261), but benefit from the Bevill exclusion, an amendment to the Resource Conservation and Recovery Act (RCRA) which allows slags to be stored at certain permitted locations. However there are continuing obligations of monitoring and management of these permitted locations If these slags could be made to pass the EPA's Toxicity Characteristic Leaching Procedure (TCLP) according to EPA Test Method 1311, then they would not qualify as hazardous waste under classifications D004 through D052 as defined RCRA (40 CFR Part 261), and they could be removed and used (for example in building and roadway construction) and the land where they had been stored reclaimed for other uses.

Despite these reasons and the substantial economic value of the metals trapped in slag piles around the world, little has been done to recover these metals because conventional wisdom was that slag had to be reheated in order to release a significant fraction of the metals from the glassy matrix. The most common slag treatment technology is slag fuming. The slag is melted in a furnace at a very high temperature and the vaporized metals are recovered. To increase the efficiency of the separation, the time of the operation is increased to allow enough time for any vaporized metal to pass through the slag layer and go with the vaporized metals. This approach, in any case, generates another slag. To increase the metal extraction in fuming, chemical additions to the melt are also required which add to the volume of the final slag. This process in very energy intensive, and does not necessarily result in complete recovery of the metal values, which means that the resulting slag may still be considered a hazardous material.

SUMMARY

This section provides a general summary of the disclosure, and is not a comprehensive disclosure of its full scope or all of its features.

Embodiments of the present invention provide for the economic recovery of metal values from slags, drosses, and other materials. Large quantities of easily recoverable slags and drosses are available at smelter sites around the world. Not only do embodiments of this invention allow for the recovery of valuable metals, some of these methods can also reduce the metal content of the slags and drosses so that they are no longer categorized as hazardous materials, allowing the waste material to be used in construction of buildings and roads.

Generally, according to a preferred embodiment of this invention, a method of recovering metal values from slags, drosses, and other materials is provided that comprises pulverizing the material into fine particles of less than 100 µm, and more preferably less than 10 µm. Metals are then leached from the pulverized material in a solution of $NH_4Cl$, and alkali and alkali earth chlorides (preferably NaCl and KCl). The pH is preferably adjusted to less than 1 through the addition of a mineral acid such as HCl or $H_2SO_4$. The metals are leached at temperature of between 70° C. and 90° C. at atmospheric pressure, until sufficient dissolution of the metals has occurred (typically one to five hours).

The pH is adjusted to precipitate iron. The pH is further adjusted and the solution is subjected to a sequential cementation recovery in which the addition of less noble metals are used to precipitate more noble metals (Ag, Cu, Pb, Co, Ni, Cd and other metals can be recovered in this manner). After the sequential recovery of these metals, zinc can be recovered from the solution by electrowinning.

The metals recovered during the sequential cementation are valuable and readily marketable. The material remaining after the leaching has had most of the metal removed, so that it is no longer considered a hazardous waste in most jurisdictions, and can be used in road and building construction. Existing slag piles are much easier, safer and less expensive to recover than are from mines. Furthermore the sites where slag is currently piled can be freed up for other uses.

Alternatively or in addition to a cementation process, metals can be recovered from the leachate by ion exchange, electrowinning, or other suitable recovery process.

DRAWINGS

The drawings described herein are for illustrative purposes only of selected embodiments and not all possible implementations, and are not intended to limit the scope of the present disclosure.

FIG. 1 is a flow chart of a process for the recovery of metals from slag, dross or other material in accordance with the principles of this invention.

Corresponding reference numerals indicate corresponding parts throughout the several views of the drawings.

DETAILED DESCRIPTION

Example embodiments will now be described more fully with reference to the accompanying drawings.

A preferred embodiment of a process for the recovery of metal values from a slag, dross, or other material is shown in FIG. 1. As shown in FIG. 1, at 22 the materials lag is pulverized into small particles, preferably less than about 100 µm, more preferably less about 75 µm, and most preferably less than about 10 µm. The material can be pulverized by grinding, or crushing, such as in a ball mill.

At 24 the pulverized particles are then leached in a solution of ammonium chloride ($NH_4Cl$) and alkali and alkali earth chlorides, preferably NaCl and KCl as well. The pH of the solution is adjusted to less than about 3, and preferably to less than about 2, and more preferably to less than about 1 using a mineral acid such as HCl or $H_2SO_4$. Oxidizing media such as cupric or ferric salts, such as, but not limited to, $CuCl_2$ or $FeCl_3$ can be added. The leaching is preferably conducted above about 70° C. and below the boiling point of the solution, and more preferably between about 70° C. and about 100° C., and most preferably between about 85° C. and about 95° C., at atmospheric pressure. Generally higher temperatures improve the leaching process, but it usually is desirable to stay well (5° C. or more) below the boiling point of the leaching solution (approximately 110° C.).

The leaching is preferably continued until substantially all of the metal in the material is dissolved. This can be detected by measuring the oxidation reduction potential (ORP), which plateaus when the reaction is completed and typically takes between one and five hours. Reaction time depends upon a number of factors, and generally can be decreased by increasing the temperature, decreasing the particle size, adjusting the addition of oxygen, and/or increasing agitation.

At 26 the material is filtered, with the leachate at 28 being fed to a reactor in which the pH is raised to about 4, for example with the addition of lime, and air is bubbled to cause the precipitation of iron. It is desirable to remove this iron because if iron is present in the electrowinning cell, it can cause a local precipitation of ferric oxides that can be incorporated in the zinc plate thereby reducing its quality; and because the iron can cause a shuttle reaction (where ferric ion is reduced to ferrous at the cathode and ferrous is oxidize to ferric at the anode). The solid material filtered at 26 typically has sufficient metal removed that it is no longer regarded as hazardous waste and can be used for construction and other purposes.

At 30 the solution is filtered to remove the precipitated iron and at 32 the filtrate is fed to a neutralization reactor where the pH is adjusted to between about 6.5 and about 7. At 34, the solution is fed to a cementation reactor where the metals more noble that zinc are precipitated through the addition of metallic zinc powder. Depending upon the concentration of these metals, the cementation can be run to be selective for some or all of the metals.

Of course zinc powder does not have to be used and other metal powders can be used to precipitate more noble metals. Zinc powder is preferred in many embodiments because it is relatively inexpensive, and because the zinc can all be subsequently recovered.

After cementation step at 34, at 36 the solution is filtered to remove any solids. At 38, the resulting filtrate is fed to an electrowinning cell where zinc is plated at a titanium cathode while the chloride is converted to chlorine at a graphite anode. The chlorine immediately reacts with ammonia to produce nitrogen and regenerate the ammonium chloride. For this reason, despite the presence of chlorides, no chlorine is evolved and an open cell can be used. The zinc produced can be fed back to the cementation process.

The Cementation Step

As described above, the precipitation of the metals is preferably effected by means of cementation (also known as "chemical displacement precipitation"). Cementation is the reaction through which a first metal is precipitated in the elemental state, from a solution containing it in dissolved form, by the addition to the solution of a second metal in the elemental state (precipitating metal) having a lower (or more negative) reduction potential with respect to the reduction potential of the first metal.

Cementation allows the leached metals present in the extraction solution to selectively precipitate one by one, suitably selecting the precipitating metal on the basis of its reduction potential.

Although cementation is selective with respect to the precipitated metal, the cement obtained generally also contains impurities of one or more of the other leached metals. The concentration of these impurities mainly depends on the difference between the reduction potential of the metals which form the impurities and that of the precipitating metal, in addition to the concentration of the respective ions in the solution subjected to cementation.

The cement typically contains the main metal precipitated in a highly pure form (higher than 95% by weight with respect to the weight of the cement; the remaining part consists of impurities of other metals in the elemental state).

The cements obtained can be re-used as such or they can be subjected to simple known purification processes, to obtain metals having an even higher purity.

Because slags, drosses and other materials typically contain more than one non-ferrous metal to be recovered, the cementation is preferably effected in a plurality of steps in series (multi-step cementation), in each of which one or more of the leached metals precipitates.

In each step, the precipitating metal is added to the solution subjected to cementation in powder form, thus favoring the chemical displacement reaction which leads to the precipitation of the metallic cement. The precipitating metal is generally added in an excess quantity with respect to that of the metal to be precipitated. Although in each step a different precipitating metal can be added, in a preferred embodiment, the metal added in each of the cementation steps is always the same.

In this preferred embodiment, the cementation is effected as follows:

In a first cementation step, a first quantity of precipitating metal is added to the extraction solution, obtaining the precipitation of the non-ferrous metal having the highest reduction potential among the metals present in solution.

The precipitating metal is added to the solution in an excess quantity with respect to the metal to be precipitated, so as to cause substantially complete precipitation of the metal to be recovered. The excess precipitating metal is calculated in relation to the specific chemical displacement reaction which takes place in the cementation step. The precipitating metal is typically added in an excess of 1 to 30% with respect to the stoichiometric quantity with respect to the metal to be precipitated.

The extraction solution is left to decant and the precipitated metal, in the elemental state, is subsequently separated from the supernatant solution by filtration.

The supernatant solution containing the remaining leached metals, (and possibly a residual quantity of ions of the first precipitated metal), is subjected to a second cementation step, wherein, by the addition of a second quantity of precipitating metal, the precipitation is caused of the non-ferrous metal having the highest reduction potential among the remaining metals present in the solution.

Due to the favorable reduction potential of the first metal, the precipitation of the second metal may be accompanied by the possible precipitation of a further quantity of the first metal.

After separating the cement of the second metal, the supernatant solution can be subjected to a third cementation step, in which a further non-ferrous metal is precipitated (the one having the highest reduction potential among those still in solution) by effecting the same operations as the previous cementation steps. The precipitation of the cement of the third metal is accompanied by the possible precipitation of increasingly less significant quantities of the previous metals precipitated.

After the precipitation of the third metallic cement, the supernatant solution is subjected to possible further cementation steps, analogously to the previous steps, until all the non-ferrous metals of interest present in the extraction solution have precipitated and been recovered.

As already described, in each cementation step, the metal used as precipitating metal can be any metal having a reduction potential lower than the reduction potential of at least one of the leached metals present in solution. In all the cementation steps, the same precipitating metal is preferably used. In this case, the precipitating metal must have a lower reduction potential with respect to the reduction potential of each of the leached metals present in solution. A metal particularly suitable for the purpose is zinc, due to its low cost and greater tendency to oxidize with respect to the non-ferrous metals typically to be recovered. The standard reduction potential of zinc for the pair $Zn^{2+}/Zn$ is in fact equal to $-0.76$ V.

This cementation process can be used to recover silver, copper, lead, cobalt, nickel and cadmium. Typically copper and the silver are recovered together, and the cobalt and the nickel are recovered together.

At the end of the last cementation step, after recovering all the leached non-ferrous metals, the supernatant solution substantially only contains the ions of the metal used as precipitant in the various cementation steps (in addition to possible residues of ions of non-precipitated leached metals). The supernatant solution can be advantageously subjected to electrolysis to recover the precipitating metal in elemental form, so that it can be re-used in subsequent recovery process cycles. In a preferred embodiment, the electrolysis of the final extraction solution is effected in an open cell, with a titanium cathode and graphite anode, according to the process described in U.S. Pat. No. 5,468,354, Process for Heavy Metal Electrowinning, and U.S. Pat. No. 5,534,131, for Process for Heavy Metal Electrowinning, and the entire disclosures of which are incorporated herein by reference.

The particular composition of the electrolytic solution, which contains $Cl^-$ and $NH_4^+$ ions, allows the electrodeposition of metallic zinc to be obtained at the cathode and the evolution of gaseous chlorine at the anode. As it is formed, the gaseous chlorine reacts rapidly with the ammonium ions present in solution around the anode forming ammonium chloride with evolution of gaseous nitrogen.

The possible electrolysis of the final extraction solution not only allows the recovery of the metallic zinc, but also the regeneration of the leaching solution, which can be re-used in the process.

The reactions involved in the electrolysis process are the following:

at the anode:

$Zn(NH_3)_2Cl_2+2e^- \rightarrow Zn+2NH_3+2Cl^-$ at the cathode:

$2Cl^- \rightarrow Cl_2+2e^-$ close to the cathode:

$Cl_2+\frac{2}{3}NH_3 \rightarrow \frac{1}{3}N_2+2HCl$

The overall chemical reaction of the electrolytic cell is:

$Zn(NH_3)2Cl_2+\frac{2}{3}NH_3 \rightarrow Zn+\frac{1}{3}N_2+2NH_4Cl$

The electrolytic process described above is particularly advantageous as it avoids the evolution of gaseous chlorine, which is a toxic gas, in favor of the evolution of gaseous nitrogen.

The zinc electrodeposited on the titanium cathode is finally recovered, for example, in the form of a metallic sheet which can be then melted into ingots. Pure zinc powder can be produced from the molten mass. The zinc powder thus recovered can be re-used in new recovery process cycles of non-ferrous metals according to the present invention.

At 40 a portion of the filtered solution is sent to a carbonization unit where alkali metal carbonates (chiefly of calcium, magnesium, and manganese) are formed. At 42 the solution is filtered to remove precipitated alkali metal carbonates, including calcium carbonate, magnesium carbonate, and manganese carbonate. These elements can be problematic for plating above certain concentrations. At 44 the solution is sent to a crystallization unit where water is removed to maintain the proper water balance of the circulating solution, and remaining leached alkali metals (including sodium and potassium) are crystallized and recovered as salts. A portion of these salts are produced by reagent additions for the pH changes.

Example 1

The reactions were proven on a bench scale where 2500 ml of water, 775 g of $NH_4Cl$, 352 g of NaCl and 15 g of KCl were combined in a 5L beaker. This mixture was heated to 50° C. under agitation until all solids were dissolved. The final solution was then heated to 90° C. and an air sparger was introduced into the solution feeding air at 1 L/min. 250 g of pulverized slag (<10 μm) was added and HCl added to adjust the pH to below about 1. The slurry was maintained at 90° C., and the pH adjusted to keep it below about 1 for about 4 hours. The reaction was substantially completed after about 2½ hours. The final slurry was filtered while maintaining its temperature above 70° C. The final residue was thoroughly washed with water before being dried. Its dry weight was 165 g and its composition was:

| | |
|---|---|
| Co | 0.082% |
| Cu | 0.360% |
| Cd | 0.002% |
| Fe | 14.27% |
| Ni | 0.015% |
| Pb | 0.220% |
| Zn | 1.160% |

The filtrate was 4.4 L, including the wash, and had the following composition:

| | |
|---|---|
| Co | 0.095 g/l |
| Cu | 0.114 g/l |
| Cd | 0.008 g/l |
| Fe | 14.27 g/l |
| Ni | 0.015 g/l |
| Pb | 1.056 g/l |
| Zn | 3.292 g/l |

The assay of the slag feed was:

| | |
|---|---|
| Co | 0.222% |
| Cu | 0.439% |

-continued

| | |
|---|---|
| Cd | 0.015% |
| Fe | 27.70% |
| Ni | 0.044% |
| Pb | 2.004% |
| Zn | 6.559% |

This resulted in the following extraction rates:

| | |
|---|---|
| Co | 75.6% |
| Cu | 45.9% |
| Cd | 91.4% |
| Fe | 90.7% |
| Ni | 59.1% |
| Pb | 92.8% |
| Zn | 88.3% |

Example 2

Samples of slag were processed as described above with respect to Example 1, and the residue was subject to TCLP testing at an independent laboratory. The results of TCLP testing of the slag, as well as the unleached slag, are shown in Table 1:

TABLE 1

Comparison of TCLP of unleached and leached slag

| Element | Unleached Slag | Leached Slag | TCLP Limit |
|---|---|---|---|
| Arsenic | ND mg/l | ND mg/l | 5 mg/l |
| Barium | ND mg/l | ND mg/l | 100 mg/l |
| Cadmium | 1.2 mg/l | ND mg/l | 1 mg/l |
| Chromium | ND mg/l | ND mg/l | 5 mg/l |
| Lead | 290 mg/l | 0.66 mg/L | 5 mg/l |
| Selenium | ND mg/l | ND mg/l | 1 mg/l |
| Silver | ND mg/l | ND mg/l | 5 mg/l |
| Mercury | ND mg/l | ND ug/l | 0.2 mg/l |

ND indicates a level below the measurable threshold

TABLE 2

Metal Content of Slag Before and After Leaching

| Element | Slag | Leached Slag |
|---|---|---|
| Lead | 2.39% | 0.12% |
| Zinc | 7.39% | 0.06% |
| Copper | 0.39% | 0.04% |
| Cobalt | 2466 ppm | 109 ppm |
| Nickel | 361 ppm | 58 ppm |
| Silver | 0.00% | <0.001% |
| Iron | 29.07% | 0.37% |
| Cadmium | 0.02% | 0.002% |

Table 2 illustrates the both the metal values found in a typical slag, and the low level of metals remaining after treatment in accordance with the principles of this invention.

Other processes can be used in addition to cementation to recover metals from the leachate, including ion exchange, electrowinning, etc.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of recovering metal values from metal-bearing materials including slags or drosses, comprising:
    pulverizing the material to particles less than about 100 µm;
    leaching the pulverized material with a solution of ammonium chloride and at least one alkali or alkali earth chloride, while maintaining the pH of the leaching solution less than about 3;
    sequentially recovering at least two metals from the leachate by the addition of zinc using a sequential cementation process; and
    recovering zinc from the solution by electrowinning.

2. The method according to claim 1 wherein the alkali and alkali earth chlorides include both sodium chloride and potassium chloride.

3. The method according to claim 1 wherein the material is pulverized to particles less than about 10 µm.

4. The method according to claim 1 wherein the leaching is conducted at about 85° C. to about 95° C.

5. The method according to claim 1 wherein the leaching is conducted at atmospheric pressure.

6. The method according to claim 1 further comprising adding sufficient mineral acid to maintain the pH of the leaching solution less than about 3.

7. The method according to claim 6 wherein the mineral acid is at least one of HCl and $H_2SO_4$.

8. The method according to claim 6 further comprising raising the pH of leachate to about 4 to precipitate iron.

9. The method according to claim 1 further comprising adding $CO_2$ to precipitate at least one of calcium, magnesium, and manganese as a carbonate.

10. The method according to claim 1 further comprising passing the leachate through a crystallizer to remove water and a salt of at least one of sodium and potassium.

11. The method according to claim 1 wherein the material is leached for a sufficient period of time that the residue after leaching meets the EPA TCLP limits according to EPA Test Method 1311 procedure in effect on the filing date of this application.

12. The method according to claim 1 wherein the material is leached for a sufficient period of time that the residue after leaching does not meet the hazardous waste classifications D004 through D052 as defined in RCRA (40 CFR Part 261) in effect on the filing date of this application.

13. A method of recovering metal values from metal-bearing materials including slags and drosses, comprising:
    pulverizing the material to particles less than about 100 µm;
    leaching the pulverized material with a solution of ammonium chloride, sodium chloride, and potassium chloride at a pH of less than about 3 and a temperature of between about 70° C. and the boiling point of the about 100° C. and at atmospheric pressure;
    sequentially recovering at least two metals from the leachate by the addition of zinc using a sequential cementation process; and
    recovering zinc from the solution by electrowinning.

14. The method according to claim 13 wherein the material is pulverized to particles less than about 10 µm.

15. The method according to claim 14 wherein the leaching is conducted at about 85° C. to about 95° C.

16. The method according to claim 13 further comprising adding sufficient mineral acid to maintain the pH of the leaching solution less than about 3.

17. The method according to claim 16 wherein the mineral acid is at least one of HCl and $H_2SO_4$.

18. The method according to claim 16 further comprising raising the pH of leachate to about 4 to precipitate iron.

19. The method according to claim 13 further comprising adding $CO_2$ to precipitate at least one of calcium, magnesium, and manganese as a carbonate.

20. The method according to claim 13 further comprising passing the leachate through a crystallizer to remove water at a salt of at least one of sodium and potassium.

* * * * *